(12) United States Patent
Braun et al.

(10) Patent No.: US 7,774,160 B2
(45) Date of Patent: Aug. 10, 2010

(54) METHOD, DEVICE, AND SYSTEM FOR VERIFYING POINTS DETERMINED ON AN ELLIPTIC CURVE

(75) Inventors: Michael Braun, München (DE); Anton Kargl, München (DE); Bernd Meyer, München (DE)

(73) Assignee: Siemens Aktiengesellschaft, Munich (DE)

( * ) Notice: Subject to any disclaimer, the term of this patent is extended or adjusted under 35 U.S.C. 154(b) by 38 days.

(21) Appl. No.: 12/223,031

(22) PCT Filed: Nov. 27, 2006

(86) PCT No.: PCT/EP2006/068919

§ 371 (c)(1),
(2), (4) Date: Jul. 21, 2008

(87) PCT Pub. No.: WO2007/087911

PCT Pub. Date: Aug. 9, 2007

(65) Prior Publication Data

US 2009/0024352 A1 Jan. 22, 2009

(30) Foreign Application Priority Data

Jan. 20, 2006 (DE) .................. 10 2006 002 891

(51) Int. Cl.
*G01B 21/04* (2006.01)
(52) U.S. Cl. .................. 702/167; 702/150; 380/28; 380/30
(58) Field of Classification Search .................. 702/167, 702/150; 380/28, 30
See application file for complete search history.

(56) References Cited

U.S. PATENT DOCUMENTS

| 7,079,650 B1 * | 7/2006 | Knudsen .................. 380/30 |
| 2006/0093137 A1 * | 5/2006 | Izu et al. .................. 380/30 |

FOREIGN PATENT DOCUMENTS

| DE | 10156708 | 6/2003 |
| EP | 1443393 A2 | 8/2004 |
| WO | WO 0025204 A1 | 5/2000 |

OTHER PUBLICATIONS

Fischer W. et al., "Parallel Scalar Mulitplication on General Elliptic Curves Over FP Hedged Against Non-Differential Side-Channel Attacks", Internet: http://eprint.iacr.org/2002/007/> Jan. 9, 2002.
Trichina E. et al., "Implementation of Elliptic Curve Cryptography with Built-in Counter Measures Against Side Channel Attacks", Cryptographic Hardware and Embedded Systems, Intenrational Workshop, pp. 98-113, Aug. 13, 2002.

\* cited by examiner

*Primary Examiner*—Drew A Dunn
*Assistant Examiner*—Hien X Vo
(74) *Attorney, Agent, or Firm*—Staas & Halsey LLP

(57) ABSTRACT

Conventional cryptographic methods that are based on elliptic curves are prone to side-channel attacks. Previously known methods for preventing side-channel attacks have the disadvantage of requiring high arithmetic capacity and a large amount of available memory space. The proposed method overcomes said disadvantage by using a process for verifying points on elliptic curves which saves arithmetic capacity and memory space.

13 Claims, 1 Drawing Sheet

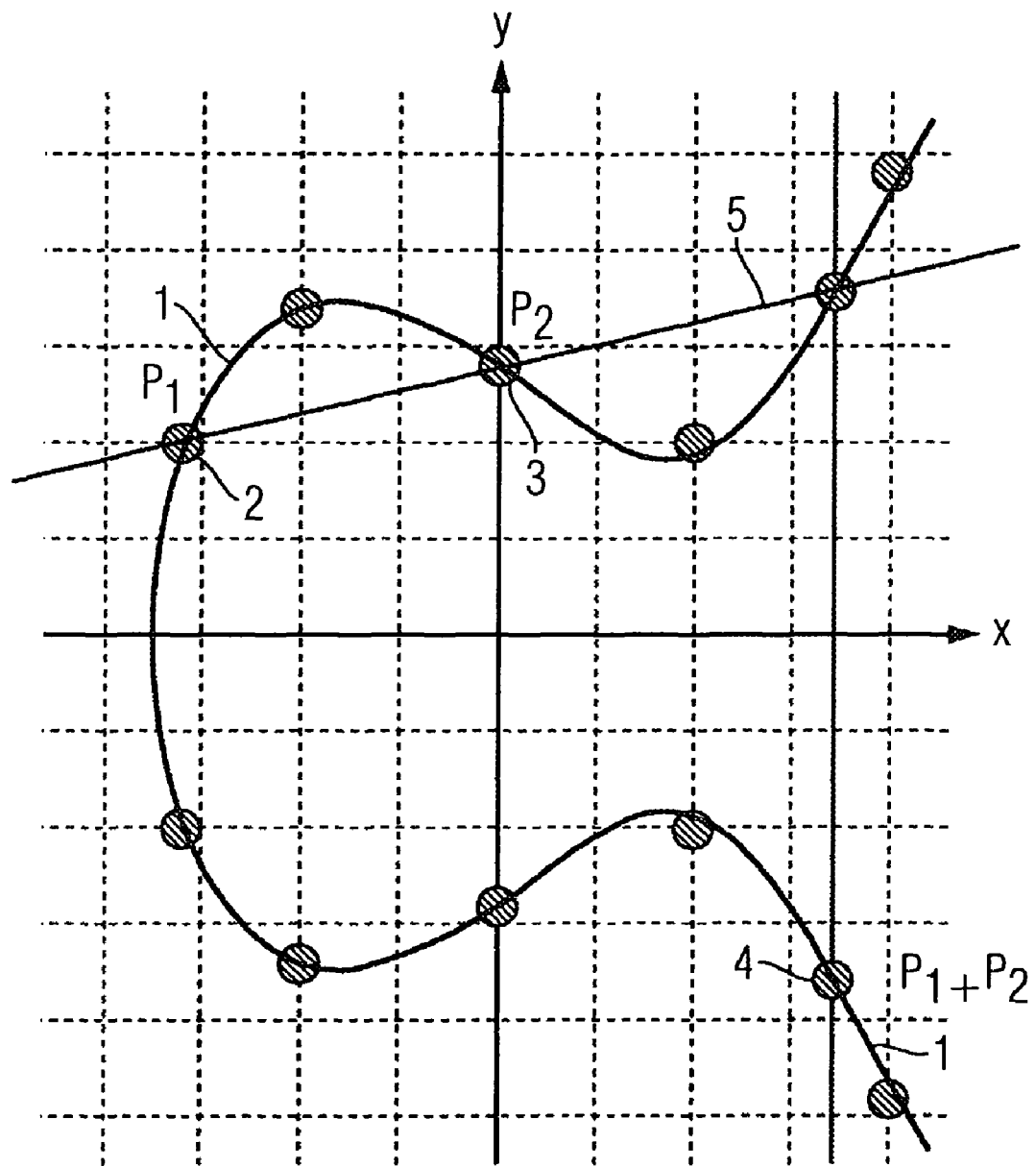

METHOD, DEVICE, AND SYSTEM FOR VERIFYING POINTS DETERMINED ON AN ELLIPTIC CURVE

CROSS REFERENCE TO RELATED APPLICATIONS

This application is based on and hereby claims priority to German Application No. 10 2006 002 891.0 filed on Jan. 20, 2006 and PCT Application No. PCT/EP2006/068919 filed on Nov. 27, 2006, the contents of which are hereby incorporated by reference.

BACKGROUND OF THE INVENTION

The invention relates to a method, a device and a system for verifying points determined on an elliptic curve.

Cryptographic techniques based on elliptic curves are very efficient; the particular reason for this is that unlike previously known cryptographic techniques, there are no known attack methods having a subexponential running time for these techniques. In other words, this means that the increase in security per bit of the security parameters used is greater for techniques based on elliptic curves, and hence significantly shorter key lengths can be used for practical applications.

Hence cryptographic techniques based on elliptic curves have a higher performance and require a smaller bandwidth to transmit the system parameters than other cryptographic techniques with a comparable level of achievable security.

The known Diffie-Hellman technique for shared-key agreement between two communications users based on elliptic curves shall be outlined here as an example. In this technique, the first communications user A knows a security parameter $r_a$ and the second communications user B knows a security parameter $r_b$. Once the two communications users have agreed on an elliptic curve and on a shared point P on this elliptic curve, the communications user A determines a value $$Q_a = r_a * P$$

and the communications user B determines a value $$Q_b = r_b * P.$$

Then the communications user A sends the value $Q_a$ to the communications user B, and the communications user B sends the value $Q_b$ to the communications user A. In a further scalar multiplication, the communications user A now determines the shared key $$K = r_a * Q_b = r_a * r_b * P$$

and the communications user B determines the same shared key $$K = r_b * Q_a = r_b * r_a * P.$$

These scalar multiplications thus form a fundamental component of cryptographic techniques based on elliptic curves. The use of elliptic curves is particularly advantageous because the inverse operation $$r_{a,b} = Q_{a,b}/P$$

can only be calculated using a considerable amount of computing effort. Based on today's level of knowledge, the scalar multiplication can be computed in polynomial time, but can only be inverted in exponential time.

Known cryptographic techniques based on elliptic curves are prone to violation by "side-channel attacks", however.

Side-channel attacks are a class of methods for cryptographic analysis. Unlike conventional attacks on cryptographic applications, in this case an attacker does not attempt to break the underlying abstract mathematical algorithm, but attacks a specific implementation of a cryptographic technique. To do this, the attacker uses easily accessible physical measured quantities of the specific implementation, such as the computation running time, the power consumption and the electromagnetic radiation of the processor during the computation, or the response of the implementation to induced errors. The physical measurements from a single computation can be analyzed directly, for example in a simple power analysis, SPA, or an attacker records the measurements from a plurality of computations using a storage oscilloscope, for example, and then performs a statistical analysis, for example in a differential power analysis, DPA. Side-channel attacks are often far more efficient than crypto-analytic techniques and may even break techniques that are considered secure in terms of the algorithm, if the implementation of these algorithms is not protected against side-channel attacks. Hence it has been recognized that the actual implementation of cryptographic techniques based on elliptic curves is critical to the degree of achievable security of the respective applications that is ultimately obtained. Such measures to counter side-channel attacks are essential for smart cards and embedded applications in particular.

"Error analysis" is an example of these side-channel attacks. In this technique, an attacker systematically manipulates the operating parameters of an implementation of a cryptographic technique to cause transient or permanent errors during the cryptographic computation. The attack is possible because the correct operation of a component, such as a smart card or an embedded system, can only be guaranteed by the manufacturer within preset environmental conditions. Hence there is a broad spectrum of technical opportunities for generating such errors, such as manipulating the clock generation, fluctuations in the supply voltage, over-temperature or under-temperature, flashes of light or selective interference using a laser, partial destruction of the electric circuits, high-level radiation etc. The differences between outputs from the circuit during correct and faulty operation can provide an attacker with information on secret data, for instance on secret keys, depending on the error model used in the implementation. With some cryptographic techniques, a single incorrect computational result is enough to result in the secret key being divulged immediately. Security-related implementations must therefore include suitable countermeasures to protect against error analysis.

Previously known countermeasures range from sensors that monitor the environmental conditions and prevent execution of the cryptographic computations in the event of inadmissible operating conditions, to algorithmic protective measures. Algorithmic protective measures, for example, can perform the cryptographic computation twice and compare the two results with each other. This has the disadvantage, however, of twice the computing effort and consequently at least double the computing time. In another known countermeasure to protect against error analyses, invariants are introduced in intermediate results of the cryptographic technique that must remain intact throughout the entire computation. Before the result of the computation is output, the device checks whether the invariant is still valid at the end of the computation. If an error occurred, it is extremely likely that the invariant is no longer satisfied. Once again, however, this method has the disadvantage that a plurality of additional computing steps need to be made and hence high demands are placed on the required computing capacity and available memory space.

In certain environments on which cryptographic techniques are to be implemented, such as smart cards or RFID chips, however, it is necessary to allow for specific requirements as regards available computing capacity and existing memory space. In these environments, however, the aforementioned techniques for defending against side-channel attacks, in particular against error analyses, have the disadvantage that they cannot be used in such systems because they require a large amount of computing capacity and available memory space.

SUMMARY

Hence it is one potential object to provide a method, a device and a system for defending against side-channel attacks, in particular side-channel attacks based on error analyses, that achieve a further reduction in the computing-time requirement and a reduction in the memory space needed compared with previously known solutions.

The inventors propose that an elliptic curve is provided in a method to verify points determined on an elliptic curve. At least one coordinate of at least one first point lying on the elliptic curve is selected or determined. This first point is multiplied by a scalar according to a defined method, with just one coordinate of the first point being used in the entire defined method. Further points are obtained as a result of the scalar multiplication, said points comprising at least one coordinate of the respective result of the first point multiplied by the scalar and of the first point multiplied by a scalar increased by a value. The determined points hence comprise the first point and the additional points. The determined points are then verified to establish whether they can lie on a straight line. The determined points are identified as verified if they can lie on a straight line. Advantageously, the method is suitable for being used in environments having limited processor resources, because determining whether the determined points lie on a straight line takes little computing effort.

A polynomial for verifying the determined points is preferably evaluated, with the evaluation of the polynomial producing one specific value precisely when the points to be verified lie on a straight line. This has the advantageous effect that the verification method can manage with even fewer multiplications and additions and hence the required computing effort is further reduced.

According to another advantageous embodiment, the determined points are verified after a definable number of fully processed bits of the scalar. This has the advantage that verification can be performed after each step of the algorithm, thereby further increasing the security, or, for example, verification can be performed only after execution of the algorithm in order to increase thereby the speed of the scalar multiplication.

According to the device for verifying points determined on an elliptic curve, the device comprises means that are configured such that the following method can be performed: an elliptic curve is provided and at least one coordinate of at least one first point on the elliptic curve is selected or determined. The first point is multiplied by a scalar according to a defined method, with just one coordinate of the first point being used in the entire defined method.

Further points are obtained as a result of the scalar multiplication, said points comprising at least one coordinate of the respective result of the first point multiplied by the scalar and of the first point multiplied by a scalar increased by a value.

The determined points hence comprise at least the first point and the additional points. The determined points are then verified to establish whether they can lie on a straight line, with the determined points being identified as verified if they can lie on a straight line.

According to the system for verifying points determined on an elliptic curve, said system comprising a first processor and a second processor, it is possible to connect together the first processor and the second processor. First, an elliptic curve and at least one coordinate of at least one first point lying on the elliptic curve are agreed between the first processor and the second processor. The first processor comprises a processor unit, which is configured such that the following method can be performed: the first point is multiplied by a scalar according to a defined method, with just one coordinate of the first point being used in the entire defined method. Further points are obtained as a result of the scalar multiplication, said points comprising at least one coordinate of the respective result of the first point multiplied by the scalar and of the first point multiplied by a scalar increased by a value. The determined points hence comprise at least the first point and the additional points. The determined points are then verified to establish whether they can lie on a straight line. The determined points are identified as verified if they can lie on a straight line. The determined and verified points are transmitted from the first processor to the second processor, with just the one coordinate of the respective point being sent for each of the points located on the elliptic curve. The second processor comprises a processor unit, which is configured such that the following method can be performed: the points transmitted from the first processor are received, and the received, determined points undergo additional processing, with just the one coordinate of the respective point on the elliptic curve being used in the entire additional processing.

BRIEF DESCRIPTION OF THE DRAWINGS

These and other objects and advantages of the present invention will become more apparent and more readily appreciated from the following description of the preferred embodiments, taken in conjunction with the accompanying drawing of which:

FIG. 1 shows a schematic diagram of an elliptic curve over real numbers.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

An elliptic curve E is generally described by a cubic equation of the following form:

$$y^2 + a_1 * x * y + a_3 * y = x^3 + a_2 * x^2 + a_4 * x + a_6,$$

where $a_1, a_2, a_3, a_4, a_6$ are fixed elements of a finite field K that parameterize the elliptic curve E. It should be noted in this context that, depending on the characteristic of the field K, the curve equation of the elliptic curve E can be transformed onto simpler curve equations.

As already mentioned above, the scalar multiplication of curve points of the elliptic curve by integers forms the basis of all cryptographic techniques based on elliptic curves. Suppose S is an integer, P a point on the elliptic curve E and Q=n*P is the n-multiple of the point P. If the points P and Q are given, then the computation of a suitable scalar n, where Q=n*P, is referred to as the discrete logarithmic problem for elliptic curves. With a suitable choice of the finite field K and the parameters of the elliptic curve E, it is not possible using current algorithms to solve the discrete logarithmic problem within a reasonable time.

A point P of elliptic curve E is defined by its x-coordinate and its y-coordinate. By virtue of the curve equation of the elliptic curve E, a maximum of two different y-values $y_1$ and $y_2$ exist for one x-value, so that the points $(x,y_1)$ and $(x,y_2)$ are points on the elliptic curve E. Hence, in order to define a point on the elliptic curve E uniquely, just one more bit of additional information is required apart from the x-coordinate.

In the case of an elliptic curve E over finite prime fields, the least significant bit (LSB) of the y-coordinate or the sign of the y-coordinate at the respective point suffices as the additional information, for example.

These properties of elliptic curves are made use of in the Montgomery ladder algorithm, which is an established method for implementing scalar multiplication on elliptic curves. The Montgomery ladder algorithm can be implemented in such a way that just the x-coordinate of a point P is used to compute the x-coordinate of a scalar multiple of P. Since the Montgomery ladder method is also an excellent way of counteracting simple power analyses, it is often implemented in cryptographic systems running on embedded systems.

According to the method described below of a Montgomery ladder algorithm, a multiple n*P of a point P located on an elliptic curve is computed.

The scalar $n=(n_1,\ldots,n_l)$, given in binary form, is processed bit-by-bit starting with the most significant bit (MSB, N1).

Suppose below that $u_i$ denotes the value of the binary form $(n_1,\ldots n_i)$ for all i from 1 to l. In the respective i-th round, (i-th iteration), the points $Q_i=u_i*P$ and $R_i=(u_i+1)*P$ are calculated as intermediate results according to the following rule, which is presented in a pseudocode:

```
Q0  ←──  O; /*Initialization*/
R0  ←──  P;
for i ←── 1 to l do /*main loop*/
    if ni = 1 then
        Qi  ←──  Qi-1 + Ri-1;
        Ri  ←──  2•Ri-1;
    else
        Ri  ←──  Ri-1 + Qi-1;
        Qi  ←──  2•Qi-1;
    fi
od
return Qli /*result n•P*/
```

In the first subroutine presented above, the value O is initially assigned to an initialization point $Q_0$, which is equivalent to initializing this variable.

In an additional initialization step, the value of the point P is assigned to an additional variable R as the initialization variable $R_0$.

In an additional step, in the actual computation loop, in each iteration in which the respective scalar value $n_i$ for that iteration has the value 1, the sum of the value of the first intermediate variable $Q_{i-1}$ of the previous iteration i-1 and the value of the second intermediate variable $R_{i-1}$ of the previous iteration i-1 is assigned to the value of a first intermediate variable Q of the iteration i (denoted by $Q_i$). Twice the value of the second intermediate variable of the previous iteration i-1 is assigned to the value of the second intermediate variable $R_i$ in the iteration i.

If the value of the scalar $n_i$ does not equal 1, the sum of the values of the sum of the first intermediate variable $R_{i-1}$ in the previous iteration i-1 and the value of the first intermediate variable $Q_{i-1}$ in the previous iteration is assigned to the second intermediate variable $R_i$ in the iteration i. Twice, i.e. double, the value of the first intermediate variable $Q_{i-1}$ of the previous iteration is assigned to the first intermediate variable $Q_i$ of the iteration i.

In the pseudocode described above, the resulting value of the intermediate variable $Q_i$ in the last iteration l is output as the result value of this operation, when all the scalar values $n_i$ of the scalar n have been processed. Optionally, the intermediate variables $R_i$ and $Q_i$ can be output as an intermediate result value after each iteration or after a definable number of iteration steps. When the results are computed without error in the Montgomery ladder algorithm, the intermediate variables after each iteration step exist in the form $$R_i=(u_i+1)\cdot P \text{ and } Q_i=u_i\cdot P$$

said variables differing only by the point P.

Accordingly, the Montgomery ladder simultaneously computes the x-coordinates of the points n*P and (n+1)*P. Since the y-coordinate of the difference of the two results is known, the complete point n*P can be reconstructed at the end of the loop from the computed x-coordinates.

This is used as the basis for a simple method for protecting a scalar multiplication on elliptic curves that tests at the end of the computation whether the result still constitutes a point on the elliptic curve. This simply involves verifying whether the coordinates of the result point satisfy the equation of the elliptic curve.

In certain environments on which cryptographic methods are to be implemented, such as smart cards or RFID chips, however, it is necessary to allow for specific requirements as regards available computing capacity and existing memory space. In these environments, however, the method described above for verifying the determined points on the elliptic curve has the disadvantage that a complete reconstruction of the result point and subsequent substitution in the elliptic curve equation makes considerable demands on the existing processor structure and hence significantly increases the required computing time.

Another method for verifying determined points on an elliptic curve equation based on the Montgomery ladder algorithm would be to dispense with the y-coordinates, so that in this case, after substituting the x-coordinate, it is necessary to verify whether a quadratic equation in y can be solved. This method also has a fundamental disadvantage that it cannot be implemented in systems having limited computing resources.

The method for verifying points determined on an elliptic curve is described in greater detail below in an exemplary embodiment.

According to the addition law of the elliptic curve, it follows that when the results are computed without errors, the points $u_i\cdot P$, $-(u_i+1)\cdot P$ and P lie on a straight line.

This is shown by way of example in FIG. 1. FIG. 1 shows an elliptic curve 1, in which the points 2 $P_1=P$, 3 $P_2=n*P$ and 4 $P_1+P_2=(n+1)*P$ are labeled. The following is true for these points:

$$P_1+P_2=P+n*P=(n+1)*P.$$

As a consequence of the addition law of the elliptic curve, and as can be seen in FIG. 1, the points $P_1$, $P_2$ and $-(P_1+P_2)$ lie on a straight line 5. This phenomenon is used in the method to verify determined points on an elliptic curve. A quadratic polynomial is used for this purpose. If this quadratic polynomial is now satisfied for the determined coordinates of the points of the Montgomery ladder algorithm $P_1+P_2=R_i=(u_i+1)\cdot P$, $P_2=Q_i=u_i\cdot P$ and $P_1=P$, the determined points are identified as verified.

In an attack causing erroneous results of the scalar multiplication, an attacker makes a targeted attempt to induce an error inside the Montgomery ladder. For a smart card or a RFID chip this is done by temperature or voltage changes, by exposure to radiation etc. for example. If the error is not induced until inside the computation of the Montgomery ladder, there are primarily two different cases to consider.

In the first case, the induced error has the effect that the result after a pass through the loop within the Montgomery ladder is not a valid point on the curve. This means that at least one of the two results $R_i$ and $Q_i$ does not have an x-coordinate of a point on the elliptic curve. In this case, the test using the quadratic polynomial will uncover this error.

In the second case, although an error is induced successfully, the results still continue to have valid x-coordinates of points on the elliptic curve. In this exemplary embodiment, we assume that the input before the error is $u_i\cdot P$ and $(u_i+1)\cdot P$. After the next pass through the loop, assuming that the error is induced in the first components, the output obtained is $n'\cdot P$ and $(2u_{i+1}+2)\cdot P$ or $n'\cdot P$ and $(2u_{i+1}+1)\cdot P$ respectively, depending on the value of the processed bit. It follows that these two results no longer differ by P, and hence the points P, $n'\cdot P$ and $-(2u_{i+1}+2)\cdot P$ or $-(2u_{i+1}+1)\cdot P$ respectively can no longer lie on a straight line. Hence the quadratic polynomial will also uncover this error in this case.

This method for efficient verification of the integrity of a computing result forms an important component for formulating error resistant, asymmetric, low-cost cryptography protocols that are used in smart cards, RFID chips or embedded systems, for example. Since y-coordinates are normally dispensed with in these protocols, a test of an x-coordinate to establish whether it is a component of a valid point is only possible by solving a quadratic equation. This test involves several computationally intensive operations, so it is not suitable for a low-cost protocol. As shown below, the quadratic polynomial can be evaluated using low computing effort, so that this method is particularly suitable for use in a low-cost application.

Examples of quadratic polynomials are given below that can be used for the simple verification of the result of a scalar multiplication using the Montgomery ladder. The characteristic of the field over which the elliptic curve is defined differs in these examples.

If the characteristic of field K equals 2, the elliptic curve is given by the equation:

$$y^2+xy=x^3+a_2x^2+a_6.$$

The values $x_1$, $x_2$, $x_3$ can be x-coordinates of points lying on a straight line precisely when the polynomial $$p(x_1,x_2,x_3)=x_3^2\cdot(x_1+x_2)^2+x_1x_2x_3+x_1^2x_2^2+a_6$$

assumes the value 0. In the projective coordinate representation, $x_1=X_1/Z_1$, $x_2=X_2/Z_2$, $x_3=X_3/Z_3$, and the point at infinity is represented by $X\neq 0$ and $Z=0$. Hence in the projective representation, the following polynomial for verification is obtained:

$$p(X_1, X_2, X_3, Z_1, Z_2, Z_3) = $$
$$X_3^2(X_1Z_2 + X_2Z_1)^2 + X_1X_2X_3Z_1Z_2Z_3 + X_1^2X_2^2Z_3^2 + a_6Z_1^2Z_2^2Z_3^2$$

If the field K has the characteristic 3, the elliptic curve is given by the equation:

$$y^2=x^3+a_2x^2+a_6$$

The values x1, x2, x3 can be x-coordinates of points lying on a straight line precisely when the polynomial $$p(x_1, x_2, x_3) = $$
$$x_3^2(x_1-x_2)^2\cdot x_3(x_1x_2(x_1+x_2-a_2)-a_6)+x_1^2x_2^2-a_6(x_1+x_2+a_2)$$

assumes the value 0.

In the projective coordinate representation, the following polynomial for verification is obtained:

$$p(X_1, X_2, X_3, Z_1, Z_2, Z_3) = $$
$$X_3^2(X_1Z_2+X_2Z_1)^2 + X_3Z_3(X_1X_2(X_1Z_2+X_2Z_1-a_2Z_1Z_2)-a_6Z_1^2Z_2^2)+$$
$$Z_3^2(X_1^2X_2^2-a_6Z_1Z_2(X_1Z_2+X_2Z_1+a_2Z_1Z_2))$$

If the characteristic of the field K is >3, the elliptic curve is given by the equation:

$$y^2=x^3+a_4x+a_6.$$

The values x1, x2, x3 can be x-coordinates of points lying on a straight line precisely when the polynomial $$p(x_1, x_2, x_3) = x_3^2(x_1-x_2)^2 - 2x_3(2a_6 + $$
$$(a_4+x_1x_2)(x_1+x_2))+x_1x_2-a_4)^2 - 4a_6(x_1+x_2)$$

assumes the value 0.

In the projective coordinate representation, the following polynomial for verification is obtained:

$$p(X_1, X_2, X_3, Z_1, Z_2, Z_3) = $$
$$X_3^2(X_1Z_2+X_2Z_1)^2 - 2X_3Z_3(2a_6Z_1^2Z_2^2 + (a_4Z_1Z_2+X_1X_2)(X_1Z_2+X_2Z_1))+$$
$$Z_3^2(X_1X_2-a_4Z_1Z_2)^2 - 4a_6Z_1Z_2Z_3^2(X_1Z_2+X_2Z_1)$$

For alternative projective representations, for example Jacobian coordinates, the representations would need to be modified accordingly. It is already demonstrated here, however, that the verification of points determined on an elliptic curve can be performed using a plurality of multiplications and additions, and is hence characterized by a considerable reduction in computing effort compared to previously known solutions.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method performed by a processor for verifying points determined on an elliptic curve, comprising:
   determining or selecting at least one coordinate of at least one first point lying on the elliptic curve;
   multiplying the first point by a scalar according to a defined method to produce a first result, with one coordinate of the first point being used in the entire defined method;
   obtaining further points as a result of the scalar multiplication, comprising at least:
   a coordinate of a second point obtained by multiplying the first point by the scalar; and
   a coordinate of a third point obtained by multiplying the first point by the scalar increased by a value;
   determining whether the first point and the further points lie on a straight line; and
   identifying the first and further points as verified when the first and further points lie on a straight line.

2. The method as claimed in claim 1, further comprising saving one coordinate for each of the first and further points.

3. The method as claimed in claim 1, wherein
   the x-coordinate is used as the coordinate determined or selected for the first point and the coordinate obtained for the further points.

4. The method as claimed in claim 1, wherein
   a polynomial is used to determine whether the first and further points lie on a straight line, and
   the polynomial produces one specific value precisely when the first and further points lie on a straight line.

5. The method as claimed in claim 4, wherein
   the polynomial evaluates the coordinates of the first and further points in the projective and/or affine coordinate representation.

6. The method as claimed in claim 1, wherein
   the scalar exists in binary form,
   the scalar is processed bit by bit starting with the most significant bit.

7. The method as claimed in claim 6, wherein
   the first and further points are determined to lie on a straight line after a definable number of processed bits of the scalar.

8. The method as claimed in claim 1, wherein
   the defined method for scalar multiplication is a Montgomery ladder algorithm.

9. A device for verifying points determined on an elliptic curve in particular according to a method as claimed in claim 1, in which the device comprises means that are configured such that the following method steps can be performed:
   a determination device to determine or select at least one coordinate of at least one first point lying on the elliptic curve;
   a multiplier to multiply the first point by a scalar according to a defined method to produce a first result, with just one coordinate of the first point being used in the entire defined method;
   an increaser to obtain further points each comprising a coordinate obtained by:
   increasing the scalar by a value; and
   summing the first result with a second result obtained by multiplying the first point by the scalar increased by the value;
   an identifier to determine whether the first point and the further points lie on a straight line and identify the first and further points as verified if the first and further points lie on a straight line.

10. The method as claimed in claim 1, further comprising indicating that the first and further points are not verified when it is determined that the first and further points do not lie on a straight line.

11. The method as claimed in claim 1, wherein the processor is incorporated into a smart card.

12. The method as claimed in claim 1, wherein the processor is incorporated into an RFID tag.

13. A system for verifying points determined on an elliptic curve, comprising:
   a first processor; and
   a second processor connected to the first processor, wherein
   an elliptic curve and a coordinate of a first point lying on the elliptic curve are agreed between the first processor and the second processor,
   the first processor comprises a processor unit, which is configured to execute a method comprising:
   multiplying the first point by a scalar according to a defined method to produce a first result, with one coordinate of the first point being used in the entire defined method;
   obtaining further points as a result of the scalar multiplication, comprising at least:
   a coordinate of a second point obtained by multiplying the first point by the scalar; and
   a coordinate of a third point obtained by multiplying the first point by the scalar increased by a value;
   determining whether the first point and the further points lie on a straight line; and
   identifying the first and further points as verified if the first and further points lie on a straight line; and
   transmitting the verified points from the first processor to the second processor, with just one coordinate being sent for each point that lies on a straight line,
   the second processor comprises a processor unit, which is configured to execute a method comprising:
   receiving the verified points transmitted from the first processor; and
   performing additional processing, with just one coordinate of each verified point being used in the entire additional processing.

* * * * *